US008413436B2

(12) United States Patent
Li et al.

(10) Patent No.: US 8,413,436 B2
(45) Date of Patent: Apr. 9, 2013

(54) OPEN ACCUMULATOR FOR COMPACT LIQUID POWER ENERGY STORAGE

(75) Inventors: Perry Y. Li, Plymouth, MN (US); James D. Van de Ven, Paxton, MA (US)

(73) Assignee: Regents of the University of Minnesota, Saint Paul, MN (US)

( * ) Notice: Subject to any disclaimer, the term of this patent is extended or adjusted under 35 U.S.C. 154(b) by 0 days.

(21) Appl. No.: 12/445,176

(22) PCT Filed: Oct. 10, 2007

(86) PCT No.: PCT/US2007/021637
§ 371 (c)(1),
(2), (4) Date: Jun. 30, 2009

(87) PCT Pub. No.: WO2008/045468
PCT Pub. Date: Apr. 17, 2008

(65) Prior Publication Data
US 2010/0018196 A1    Jan. 28, 2010

Related U.S. Application Data

(60) Provisional application No. 60/850,577, filed on Oct. 10, 2006.

(51) Int. Cl.
*F15B 1/00* (2006.01)

(52) U.S. Cl.
USPC .............................................. 60/415; 60/418

(58) Field of Classification Search .................... 60/414, 60/415, 418
See application file for complete search history.

(56) References Cited

U.S. PATENT DOCUMENTS 3,780,624 A * 12/1973 Webb ............................... 91/491
4,182,128 A    1/1980 Gardner .......................... 60/652
4,246,978 A * 1/1981 Schulz et al. .................... 60/414

FOREIGN PATENT DOCUMENTS

GB    537 515    6/1941
JP    63-115997    5/1988

OTHER PUBLICATIONS

"Thermal Losses in Gas-Charged Hydraulic Accumulators", by D. Otis, Proceedings of the 8$^{th}$ Intersociety Energy Conversion Energineering Conference AIAA, 1973, pp. 198-201.
"An Experimental thermal Time-Constant Correlation for Hydraulic Accumulators", by A. Pourmovahed, Journal of Dynamic Systems, Measurement and Control, Fairfield, NJ, 1990, pp. 116-121.
"Durability testing of an Elastomeric Foam for Use in Hydraulic Accumulators", by A. Pourmovahed, Proceedigns of the 8$^{th}$ Intersocety Energy Conversion Engineeering Conference AIAA, 1988, pp. 31-36.
Search Report and Written Opinion, PCT/US2007/021637, dated Feb. 4, 2008.

* cited by examiner

Primary Examiner — Thomas E Lazo
(74) Attorney, Agent, or Firm — Westman, Champlin & Kelly, P.A.

(57) ABSTRACT

An accumulator system is configured to store energy and includes an accumulator having a liquid chamber coupled to a liquid port and an air chamber coupled to an air port. The liquid chamber and the air chamber are separated by a moveable isolation barrier. An air motor/compressor coupled to the air port is configured to receive a mechanical input and responsively pump air into the accumulator, and to receive pressurized air from the air port and responsively provide a mechanical output. A liquid reservoir is coupled to the liquid port to receive liquid from the liquid chamber as air is pumped into the air chamber and to provide liquid to the liquid chamber as air is removed from the air chamber.

22 Claims, 10 Drawing Sheets

US 8,413,436 B2

OPEN ACCUMULATOR FOR COMPACT LIQUID POWER ENERGY STORAGE

The present application is a Section 371 National Stage Application of International patent application Serial No. PCT/US2007/021637, filed 10 Oct. 2007, and published in English which is based on and claims the benefit of U.S. provisional patent application Ser. No. 60/850,577, filed Oct. 10, 2006, the contents of which are hereby incorporated by reference in their entirety.

GOVERNMENT RIGHTS

The United States government has certain rights in this invention pursuant to Agency Grant No. EEC 0540834 awarded by National Science Foundation.

BACKGROUND OF THE INVENTION

The present invention relates to accumulators of the type which are used to store mechanical energy. More specifically, the present invention relates to accumulators which store energy using a compressed gas.

Accumulators are a type of energy storage device which are used to store mechanical energy in the form a compressed gas. Recently, interest in accumulators has grown because they can be used in fuel efficient cars whereby energy which may be lost during the braking activity can be stored and subsequently reused.

Energy storage devices for liquid power applications that are significantly more compact than existing ones will enable energy regeneration for many applications, including fluid power hybrid vehicles and construction equipment. One approach to hydraulic energy storage makes use of a compressed gas enclosed in a closed chamber. As the system must contain the expanded gas and the hydraulic oil which is displaced, the optimal energy density occurs at a relatively modest expansion ratio resulting in a small energy density.

SUMMARY OF THE INVENTION

By allowing intake and exhaust of compressed and expanded air from and to the atmosphere, a potential order of magnitude increase in energy density is available for the same maximum system pressure in accordance with the accumulator of the present invention. An accumulator system is configured to store energy and includes an accumulator having a liquid chamber coupled to a liquid port and an air chamber coupled to an air port. The liquid chamber and the air chamber are separated by a moveable isolation barrier. An air motor/compressor is coupled to the air port and configured to receive a mechanical input and responsively pump air into the accumulator. The air motor/compressor is also configured to receive pressurized air from the air port and responsively provide a mechanical output. A liquid reservoir is coupled to the liquid port to receive liquid from the liquid chamber as air is pumped into the air chamber, and to provide liquid to the liquid chamber as air is removed from the air chamber.

DETAILED DESCRIPTION OF ILLUSTRATIVE EMBODIMENTS

Figure 1A:
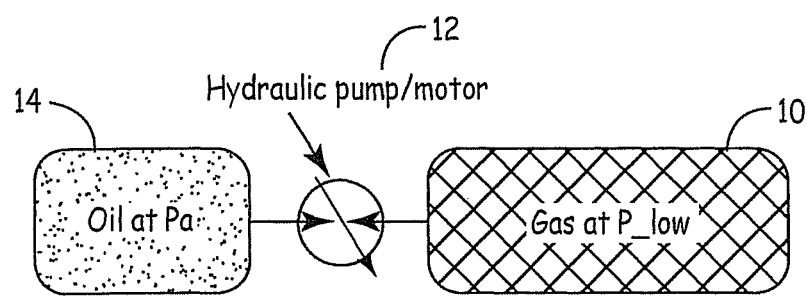
FIG. 1A is a simplified block diagram of a "closed" accumulator in an unenergized state and FIG. 1B in an energized state.

Energy storage density in hydraulic systems is severely limited relative to competing technologies. For example, volumetric energy storage densities of electric batteries are of the order of 1 MJ/liter, whereas those of hydraulic accumulator configurations are typically less than 10 kJ/liter (at 35 MPa). Hydraulic systems however have an order of magnitude advantage in power densities relative to electric systems. Dramatic improvement in energy storage densities for hydraulic systems can enable regeneration in many applications where space, weight, and power are critical. One example is hybrid passenger vehicles where space for energy storage is a premium (compared to larger vehicles such as buses and trucks). As an example, to capture the 380 kJ of braking energy of a 1000 kg vehicle traveling at 100 km/h currently about 50 liters volume would be required.

In current practice, hydraulic energy storage is typically achieved by an accumulator. One common accumulator design consists of an enclosed inert gas chamber connected to a hydraulic circuit. The basic configuration has been unchanged for decades. The fixed volume enclosure has a gas chamber and an oil chamber. As the oil chamber volume increases, the gas chamber volume decreases correspondingly. Typically, the gas chamber is a bladder enclosure or a volume enclosed by a sliding piston, and the gas within is precharged to a nominal pressure. Energy is stored by pumping pressurized oil into the accumulator, thus reducing the gas volume. Energy is regenerated as the compressed gas pushes the stored oil back into the hydraulic circuit. Since the gas is always contained within the accumulator, this configuration is referred to herein as a "closed" accumulator.

Previous approaches to increasing hydraulic energy storage density have typically focused on improving the thermodynamic process and hence the available energy. The system configuration remains unchanged. (See, Otis, D., 1973. "Thermal losses in gas-charged hydraulic accumulators". In Proceeding of the 8th Intersociety Energy Conversion Engineering Conference, AIAA, pp. 198-201; Otis, D., 1990. "Experimental thermal time-constant correlation for hydraulic accumulators". *ASME Journal of Dynamic Systems, Measurement and Control,* 112(1), pp. 116-121; Pourmovahed, A., 1988. "Durability testing of an elastomeric foam for use in hydraulic accumulators". In Proceedings of the AIAA Intersociety Energy Conversion Engineering Conference, Vol. 2, pp. 31-36; and Pourmovahed, A., Baum, S. A., Fronczak, F. J., and Beachley, N. H., 1988. "Experimental evaluation of hydraulic accumulator efficiency with and without elastomeric foam".

Elastomeric foams have also been introduced in the compressed gas. The foam reduces temperature variations during compression and expansion. This has the effect of allowing the gas compression and expansion to be closer to the isothermal process rather than an isentropic process. The energy density has been reported to be increased by up to 40%. The use of fine metallic strands bonded to the casing has been shown to improve the heat transfer to the atmosphere, such that the gas compression expansion process can also be closer to isothermal. This also has the effect of increasing performance by 15%-40%.

In pneumatic systems, compressed gas is also used as an energy storage. Storage tanks with air pressurized up to 2.1 MPa (300 psi) are used to power pneumatic systems. In contrast to hydraulic systems, the compressed air is exhausted to the atmosphere. Carbon dioxide/dry ice has also been used as energy storage for pneumatic systems. This approach has limited use because the available system pressure with $CO_2$ is limited (it has a triple point pressure at 0.52 MPa). For example, a hydraulic power source for artificial limbs has been developed which uses liquefied gas. It is used in storing energy generated by normal walking. The phase change of the liquefiable gas produces a constant 3.4 MPa (500 Psi) pressure head.

Compressed air is used in energy storage for electric plants. Such compressed air energy storage (CAES) uses large ($10^6$ $ft^3$) underground caverns to store compressed air up to 7.7 MPa (1100 psi). Regeneration is achieved by mixing the compressed air with natural gas which is then used to power a turbine for electricity generation. There are currently two plants in the US that utilize CAES for energy storage A similar idea of using compressed air as energy storage is being developed on smaller scale to power devices such as uninterruptible power supplies (UPS).

The present invention provides an approach for dramatically increasing hydraulic energy storage density. The approach is based on the discovery and recognition that in current hydraulic accumulator configurations, the volume is determined by the volume of the expanded gas. The system must also hold the volume and weight of the hydraulic oil displaced, which is given by the change in volume by the gas expansion. While more energy can be recuperated by increasing the decompression ratio, this is accompanied by large increases in the expanded gas and the displaced oil volume. Hence, the decompression ratio for optimal energy density is limited to between 2 and 3. This is a fundamental constraint of the current system configuration so that any increase in energy density that can be achieved by improving the thermodynamic process (e.g. shifting from adiabatic process to isothermal process) will only be marginal.

The present invention provides an "open accumulator" design in which compressed gas is exhausted to the atmosphere during expansion, and intake is also taken from the atmosphere. In comparison to the "closed accumulator" case, significantly more energy can be obtained from the same compressed gas pressure and volume because the gas is allowed to expand to atmospheric pressure. Furthermore, as the expanded air is exhausted to the atmosphere, the system does not have to account for the volume of the expanded gas, nor the volume of the displaced hydraulic oil. A potential 20 fold increase in volumetric energy storage density for the same compressed gas pressure can be achieved at conventional hydraulic pressure (35 MPa) [5000 Psi].

The energy density of the current "closed" accumulator configuration is analyzed below as is the new "open accumulator" of the present invention. One example design of the air compressor/motor, which is an important component in the open accumulator approach, is described. Simulation case studies for the compressor motor and for the overall "open accumulator" system are also provided.

Figure 1B:
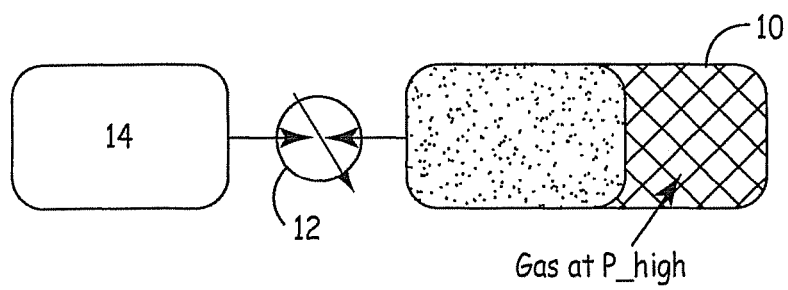

FIG. 1A shows a closed accumulator 10 configuration when the accumulator is empty. FIG. 1B illustrates when the accumulator 10 is fully charged. Shaft work is input through a motor/pump 12 as the system transitions from FIG. 1A to 1B. Shaft work is extracted from the motor/pump 12 as the system transitions from FIG. 1B to 1A. The total volume in defining the energy density can be considered to be just the accumulator, or the accumulator together with the displaced hydraulic oil.

A conventional accumulator consists of a fixed volume enclosure with a gas chamber 10 and an oil chamber 14. The gas chamber 10 is either a bladder enclosure or a volume enclosed by a sliding piston. The gas is precharged to a nominal pressure. During storage phase, mechanical shaft work is used to pump oil into the accumulator, thus reducing the gas volume and increasing its pressure. Energy is regenerated as the compressed gas expands, expelling oil back through the hydraulic motor 12. As the gas is always contained within the accumulator 10, this configuration is referred to herein as a closed accumulator.

Figure 2A:
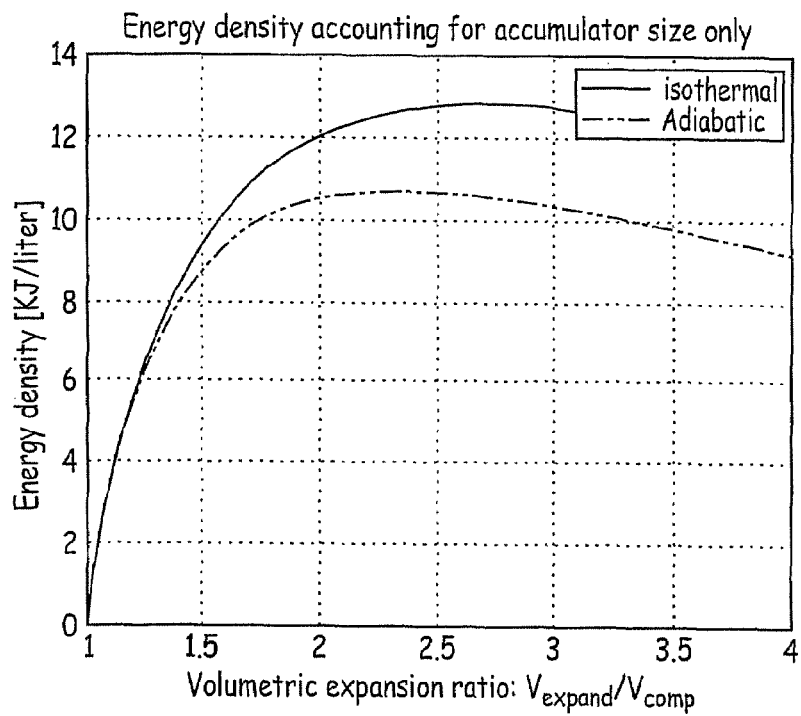
FIGS. 2A and 2B are graphs showing energy density versus volumetric expansion ratio.
Figure 2B:
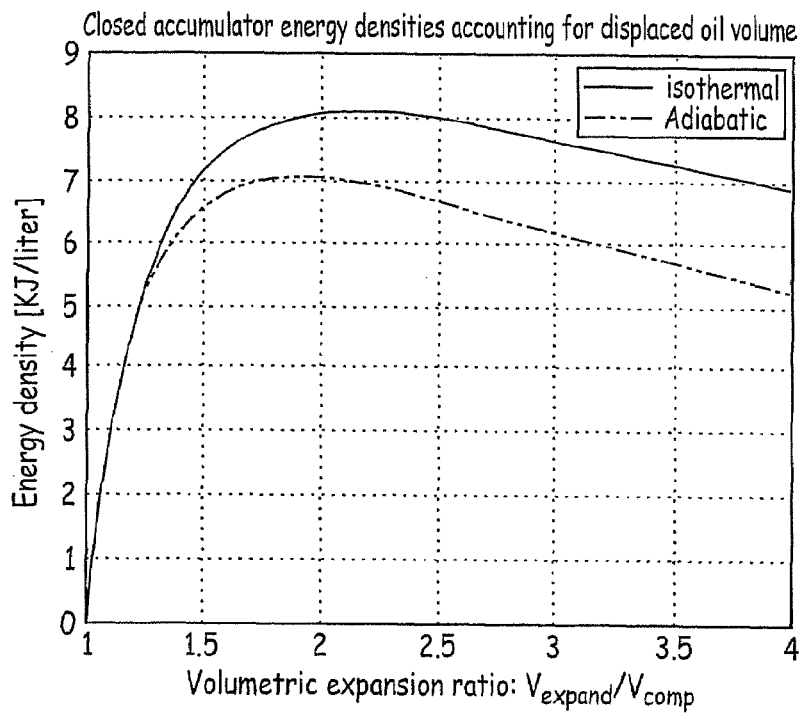

The volumetric energy density of such a closed accumulator can be defined as:

$$E_\eta = \frac{\text{Available Energy}}{\text{Total Volume}} \quad \text{Eq. (1)}$$

where the available energy is the maximum energy that can be extracted for a fully charged closed accumulator at pressure $P_{comp}$, the total volume is either the volume of the accumulator itself or the volume of the accumulator and the volume of liquid that will have been displaced when the accumulator is empty. The volumetric energy densities of a closed accumulator with $P_{comp}=35$ MPa as functions of the volumetric expansion ratio $r:=V_{exp}/V_{comp}$, where $V_{exp}$ and $V_{comp}$ are the expanded and compressed gas volumes are shown in FIGS. 2A and 2B. The gas is assumed to be ideal and undergoes either an isothermal or an adiabatic process, and the oil reservoir is at atmospheric pressure $P_{atm}=0.1$ MPa.

When the gas first undergoes an isothermal expansion/compression process, the compressed and expanded gas pressures and volumes are $P_{comp}$ and $P_{exp}$, and $V_{comp}$ and $V_{exp}$, respectively. The available energy is computed from $$W_T = \int_{V_{exp}}^{V_{comp}} (P - P_a) dV \quad \text{Eq. (2)}$$
$$= P_{comp} V_{comp} \ln(r) - P_a(V_{exp} - V_{comp})$$

where the work on or by the atmosphere is included. The volume of the accumulator is at least $V_{exp}$. Hence, the isothermal energy density without accounting for the displaced oil volume is:

$$E_{\eta,T}^g = P_{comp} \frac{\ln(r)}{r} - P_a \frac{r-1}{r} \quad \text{Eq. (3)}$$

The energy density of such a configuration is greatest when $r=2.71$, giving an energy density of 12.81 kJ/Liter at a compressed gas pressure of 35 MPa. For energy regeneration in hydraulic hybrid vehicles, a typical energy storage requirement is 380 kJ. Thus, 29 liters of storage is needed. The displaced oil volume is $V_{exp}-V_{comp}$. Thus, the total volume of the system that includes the accumulator volume and the displaced oil volume is at least $2V_{exp}-V_{comp}$. Hence the energy density with the volume of displaced oil accounted for:

$$E_{\eta,T}^{total} = P_{comp}\frac{\ln(r)}{2r-1} - P_a\frac{r-1}{2r-1}. \qquad \text{Eq. (4)}$$

This is maximized at r=2.15 giving an energy density of 8.08 kJ/liter at a compressed gas pressure of 35 MPa. 380 kJ storage for a hydraulic hybrid vehicle would require 47 liters of total volume.

Similar expressions can be obtained if the gas undergoes an adiabatic process. The available energy is given by:

$$W_s = \left[P_{comp}\frac{(1-r^{1-\gamma})}{\gamma-1} - P_a(r-1)\right]V_{comp} \qquad \text{Eq. (5)}$$

The energy density (not taking into account the volume of the hydraulic liquid displaced) is given by:

$$E_{\eta,s}^g = P_{comp}\frac{(1-r^{1-\gamma})}{(\gamma-1)r} - P_a\frac{r-1}{r} \qquad \text{Eq. (6)}$$

where γ1.4 is the ratio of the isobaric thermal capacity to the isovolumic thermal capacity of a diatomic gas. This is maximized at r=2.31, giving an energy density of 10.72 kJ/liter. 380 kJ storage requires 35 liters of accumulator volume. When the hydraulic liquid is taken into account, the energy density is given by:

$$E_{\eta,s}^{total} = P_{comp}\frac{(1-r^{1-\gamma})}{(\gamma-1)(2r-1)} - P_a\frac{r-1}{2r-1} \qquad \text{Eq. (7)}$$

This is maximized at r=1.91, giving an energy density of 7.04 kJ/liter. A 380 kJ storage would require 53 liters of total volume. In both the isothermal and adiabatic cases, the available energies in Eqs. (2) and (5), and hence the numerator in Eq. (1), increases with the expansion ratio r. This, however, is at the expense of an increase in the total volume (in the denominator of Eq. (1)), which depends largely on the expanded gas volume. The energy density of the closed accumulator is therefore limited because the system must contain the volume of the expanded gas volume as well as the displaced hydraulic oil. This makes expanding the compressed gas beyond the optimal expansion ratio r to extract more energy detrimental to the energy densities.

FIGS. 2A and 2B show volumetric energy density of closed accumulator system for compressed gas pressure of 35 MPa where the volume concerned accounts for gas volume only (2A), and where the volume accounts for both gas and the displaced oil (2B).

Figure 3:
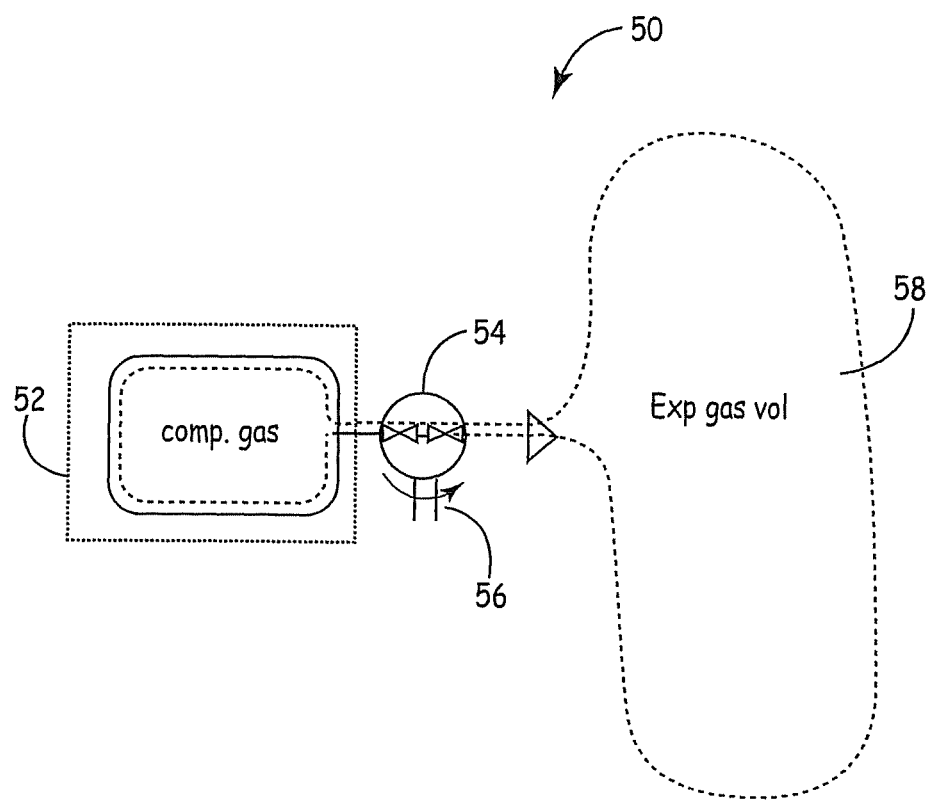
FIG. 3 is a simplified diagram of an "open" accumulator.

FIG. 3 is a simplified diagram of an energy storage system 50 in accordance with one example embodiment of the present invention. Energy storage system 50 includes an accumulator 52 and an air motor/compressor 54 coupled to a work shaft 56. Atmospheric gas 58 couples to air motor/compressor 54. Atmospheric air is compressed into the accumulator 52 during storage phase. Compressed air is expanded to the atmosphere during motoring phase. System volume does not need to contain the air at atmospheric pressure which is instead contained in the atmosphere.

Rather than keeping a fixed mass of gas in the closed accumulator and allowing it to compress and expand, in the open accumulator system, air is drawn from the atmosphere and compressed into the accumulator 52 during the storage phase, and is expanded to the atmosphere again during the regeneration phase. Mechanical work is stored and extracted through a pneumatic compressor/motor 54. Advantages of the open system include:
1. This allows for a high expansion ratio that significantly increase the available energy.
2. The accumulator volume will be decreased because it needs only account for the compressed air volume instead of the expanded air volume and the displaced oil as in the closed accumulator case.
3. The displaced oil that makes up the difference between the compressed gas volume and the expanded gas volume is no longer required, saving both volume and weight.

Figure 4:
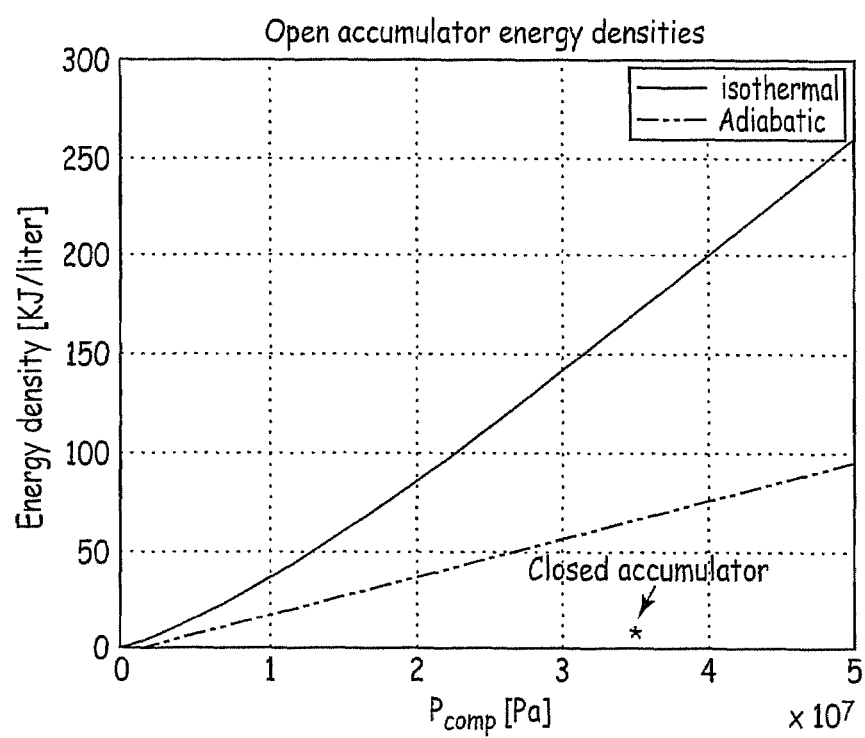
FIG. 4 is a graph of energy density versus pressure.

For example, assuming an isothermal process, the available energy for a given volume of compressed air in an open accumulator will be increased by 6.5 fold compared to the optimal closed accumulator with the same maximum pressure of 35 MPa with r=2.15. Since the closed accumulator must account for 2r−1 times the compressed air volume, the system volume will be decreased by (2×2.15−1)=3.3 times in the open accumulator, for the same volume of compressed gas. Thus, the overall increase in energy density in an isothermal process will be given by 6.5×3.3=21.5 folds. The energy densities of the open accumulator system under isothermal and adiabatic conditions is shown in the graphs of FIG. 4 which shows the volumetric energy density of open accumulator system for compressed gas pressure of 35 MPa. They are computed from the available work given by Eqs. (2) and (5), and the total volume given by the compressed gas volume $V_{comp}$. Hence, the energy density of the open accumulator system, assuming an isothermal process, is given by:

$$E_{\eta,T}^{open} = P_{comp}\ln(r) - P_a(r-1) \qquad \text{Eq. (8)}$$

where $$r = \frac{P_{comp}}{P_a}$$

for the isothermal process. Since the volume expansion ratio r increases with $P_{comp}$, the energy density increases super-linearly with respect to $P_{comp}$. For $P_{comp}$=35 MPa, $E_{\eta,T}^{open}$=170 kJ/liter so that a 380 kJ storage would only require 2.24 liters.

If an adiabatic process is assumed, the energy density of the open accumulator is:

$$E_{\eta,s}^{open} = P_{comp}\left[\frac{\left(r_p^{\frac{1-\gamma}{\gamma}}-1\right)}{\gamma-1} - \frac{r_p^{\frac{1}{\gamma}}-1}{r_p}\right] \qquad \text{Eq. (9)}$$

where $r^p:=P_{comp}/P_a$ is the pressure ratio which is related to the volume expansion ratio r by $r^\gamma=r_p$. At $P_{comp}$=35 MPa, r=65.5, $E_{\eta,s}^{open}$=64.62 kJ/liters which is 9.2 times that of the closed accumulator system under the adiabatic expansion condition. A 380 kJ storage would require 5.88 liters. The energy density of an open accumulator is illustrated graphically in FIG. 4.

While the open accumulator concept is simple, and theoretically provides an order of magnitude increase in energy density, there are several challenges to realizing its potential. Most are due to the high compression ratio and the use of air (which contains $O_2$) instead of inert gas as in closed accumulators. These include:
1. Safety in compressing and storing high pressure air;
2. excessive temperature excursions during compression and expansion;
3. accumulator pressure can become too low to be useful;
4. lack of high power and efficient pneumatic compressor/motor.

Storing and production of compressed air at 42 MPa is routinely achieved in Scuba diving tanks. In contrast, with the present invention, a desired operating pressure is only 35 MPa. Thus, high pressure compressed air is not inherently unsafe. Safety concern stems from the risk of igniting hydraulic oil or oil vapor in the presence of compressed air. This can be avoided by utilizing non-flammable liquid in conjunction with the open accumulator, with proper sealing, and by using materials that properly separate oil and air if necessary. In the basic open accumulator concept, as shown in FIG. 3, being a completely pneumatic approach, does not even require hydraulic liquid. Concerns (2) and (3) and their potential solutions are discussed below, as is one potential design of an efficient air compressor/motor.

Isothermal Operation and the Use of Phase Change Material or Materials with High Specific Heat Capacity Although the open accumulator operating adiabatically has a high energy density compared to the closed accumulator system, adiabatic operation at high compression/expansion ratios leads to excessively high or low temperatures which is a challenge for readily available materials to withstand.

The temperature change of a gas being compressed or expanded adiabatically can be estimated by considering the internal energy of the air:

$$nc_v \Delta T = -\text{Work} = -P_{comp} V_{comp} \frac{r^{1-\gamma} - 1}{1-\gamma} \quad \text{Eq. (10)}$$
$$= nRT \frac{(r^{1-\gamma} - 1)}{1-\gamma}$$

where n is the number of moles of air, R=8.3144 J/mol-K is the Universal Gas constant, $c_v$=2.5R is the molar thermal capacity of air (with diatomic gas species). Therefore, $$\frac{\Delta T}{T_{init}} = \frac{r^{1-\gamma} - 1}{2.5(1-\gamma)} = -(1 - r^{-0.4}) \quad \text{Eq. (11)}$$

where $T_{init}$ is the initial temperature, and r is the volumetric expansion ratio. From this, $$T_{final} = T_{init} + \Delta T = T_{\_}\{init\} r^{-0.4} \quad \text{EQ. (12)}$$

Thus, air at atmospheric pressure $P_a$=0.1 MPa and $T_{init}$=278K when compressed to P=35 MPa would have a temperature of 1583K. Compressed air at P=35 MPa and $T_{init}$=278K when expanded to atmospheric pressure will have a temperature of 56K. These are extremely hot and cold temperatures which will be challenging to the components.

For this reason, in one aspect, the system of the present invention is designed to operate close to an isothermal condition. In addition to avoiding excessive temperatures, this also results in 2.6 fold increase in energy density over an adiabatic process.

To achieve this, it is necessary to have an environment that can serve as a heat sink during compression and as a heat source during expansion, and whose temperature does not change significantly. The atmosphere can be such an environment if an abundance of ambient air flow is available around the air compressor/motor. Another possibility is to utilize a phase change material (PCM) or any materials with a high specific heat capability as a constant or nearly constant temperature bath to the air that is being compressed or that is expanding. The PCM material or the like can be deployed around the air compressor/motor. The PCM material or the like will provide a local energy source or energy sink during expansion and compression so that the process occurs at nearly constant temperature as determined by the phase transition temperature of the PCM. Table 1 shows several common PCMs (solid-liquid) and their thermal properties (see, Clark, J. A., 1985. *Thermal energy storage.* McGraw-Hill Book Co.):

TABLE I

| PCM | Trans temp [deg C.] | Latent Heat ($H_V$) [kJ/Liter] | Latent Heat ($H_m$) KJ/Kg | Overall energy density $E_{\eta,T}^{g+PCM}$ @35 Mpa[kJ/liter] |
|---|---|---|---|---|
| Water | 0 | 306 | 333.4 | 109.3 |
| $CaCl_2 \cdot 6H_2O$ | 29 | 311 | 190.8 | 109.9 |
| $Na_2SO_4 \cdot 10h_2O$ | 32.4 | 358 | 253 | 115.3 |
| $Na_2S_2O_3 \cdot 12H_2O$ | 36 | 426 | 280 | 121.6 |

Figure 5:
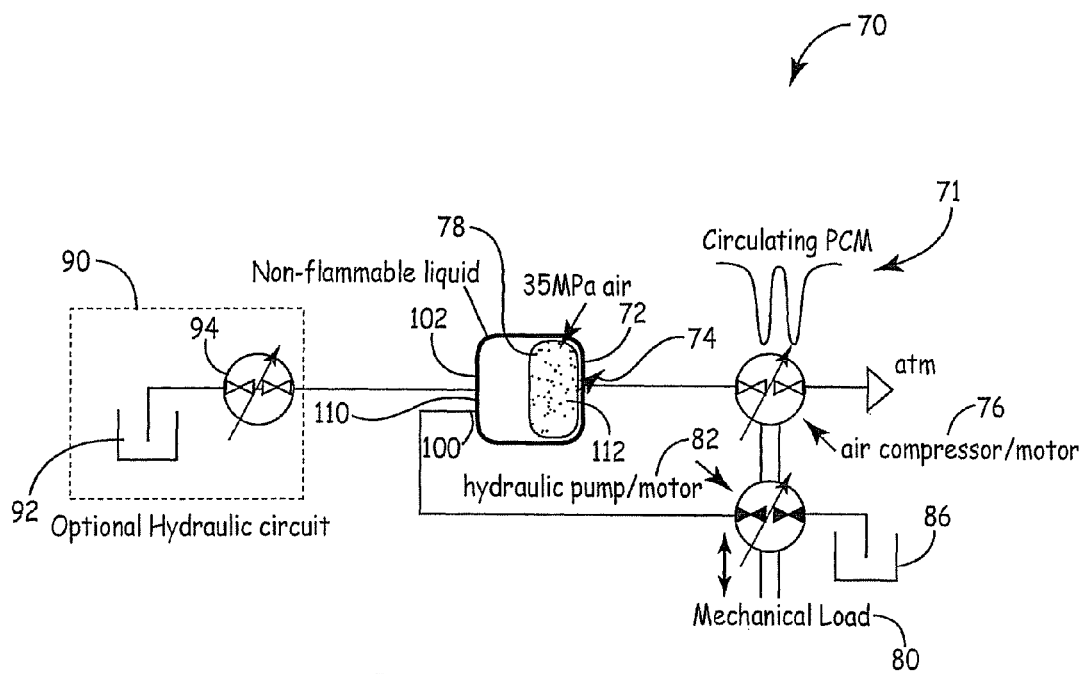
FIG. 5 is a simplified diagram showing an open accumulator including a hydraulic connection.

The PCM material or the like can be encapsulated in pellets which are then circulated in a liquid slurry to improve heat transfer. This is illustrated as shown in FIG. 5 where the PCM material or the like 71 is shown to circulate the air compressor/motor 76. For an ideal isothermal process, the heat exchange with the PCM or the environment equals the energy stored or regenerated. Thus, the overall energy density will be $$E_{\eta,T}^{open+PCM} = \frac{EnergyAvailable}{V_{comp} + V_{PCM}} = \frac{E_{\eta,T}^{open} H_V}{E_{\eta,T}^{open} + H_V} \quad \text{Eq. (13)}$$

where $E_{\eta,T}$ is the isothermal energy density, and $H_V$ is the volumetric latent heat density. The overall energy density with the various PCMs operating at a compressed air pressure of 35 Mpa is given in Table 1 showing a 13 to 15 fold increase over existing closed accumulator system.

The above calculation shows that from a thermal capacity standpoint, it is possible to utilize a PCM to absorb and regenerate all the heat needed to maintain an isothermal process without a significant volume penalty. In reality, the ambient environment can also be a source or sink of some heat, so that even less PCM is needed.

In addition to having a heat source/sink being available, there should be adequate heat transfer to and from the air being compressed and expanded. Limitations in heat transfer may have ramifications on the power capability of the open accumulator.

The use of a PCM as a heat source/sink has some similarity to the use of thermal foam in closed accumulators (see, Pourmovahed, A., Baum, S. A., Fronczak, F. J., and Beachley, N. H., 1988. "Experimental evaluation of hydraulic accumulator efficiency with and without elastomeric foam". *Journal of Propulsion and Power,* 4(2), March-April, pp. 185-192). For the open accumulator configuration, PCM and enhanced heat transfer are recommended for the air compressor/motor, whereas perfect insulation is recommended for the accumulator so as to maintain, in the compressed air, the heat associated with any un-intended increase in temperature during compression.

Constant Pressure Operation

In a typical closed accumulator system, as energy is depleted, pressure decreases and an increase in flow is required to achieve the same power level. The situation may be exacerbated in the open accumulator case if it is implemented as shown in FIG. 3, because the pressure will fall as low as the atmospheric pressure. Instead, in one configuration of the present invention, the compressed gas volume and molarity decreases while maintaining constant pressure. This configuration can be achieved by using a constant volume accumulator consisting of a liquid (non-flammable hydraulic liquid) chamber and a gas chamber separated by a piston or a bladder. As energy is stored, compressed air is pumped into the air side of the accumulator and at the same time the liquid is emptied to maintain a constant pressure. As energy is used, compressed air volume decreases, and the voided volume is then refilled by the liquid.

FIG. 5 shows a configuration of an energy storage system 70 that can be controlled to achieve the above. Energy storage system 70 includes an accumulator 72 having an air port 74 coupled to an air compressor/motor 76. The air compressor/motor is coupled to a mechanical input/output 78 which can comprise, for example, a shaft. The accumulator 72 includes a bladder, piston configuration, or other moveable isolation barrier 78 which separates air from the non-flammable liquid. A hydraulic pump/motor 82 is also coupled to the mechanical load 80 and is configured to pump hydraulic liquid between a reservoir 86 and the accumulator 72 or to provide motoring mechanical work as high pressure hydraulic fluid is bled through it to the reservoir. An optional hydraulic circuit 90 is also provided which includes a reservoir 92 and a variable displacement hydraulic pump/motor 94 coupled to the accumulator 72. Hydraulic pump/motor 82 couples to the accumulator 72 at hydraulic port 100 and the hydraulic circuit 90 couples to the accumulator at hydraulic port 102.

In normal operation when the power demand is within the capability of the pneumatic compressor/motor mechanical work is put in and taken out mainly through the air compressor/motor 76. The air compressor/motor 76 is connected in tandem to a small hydraulic pump/motor 82 and the mechanical load or prime mover 80. In the storage phase, shaft work is used to drive the air compressor 76 to compress air from the atmosphere to a high pressure (for example, 35 MPa). This will normally increase the pressure in the accumulator 72. To off-set this increase, hydraulic fluid is bled into the hydraulic motor 82 thereby increasing the volume of the air chamber in the accumulator 72, having the effect of decreasing pressure. The work thus obtained, is used to offset the mechanical input needed for the compressor 76. In the regeneration phase, the air motor/compressor 76 acts as a motor and compressed gas in the accumulator 72 is bled to the atmosphere through the air motor. This would normally decrease the accumulator pressure. To offset this decrease, a small portion of the compressor shaft work is used to drive the hydraulic pump 82 which pumps hydraulic liquid from the reservoir 86 into the hydraulic liquid chamber of the accumulator. This decreases the volume of the air chamber in the accumulator 76 and has the effect of increasing the pressure in the accumulator. The remaining shaft work is then consumed by the mechanical load 80. To maintain the accumulator pressure, the hydraulic pump/motor 82 displacement must be controlled in coordination with the air compressor/motor 76.

An added benefit with a constant volume accumulator that consists of a hydraulic liquid chamber 110 and a compressed air chamber 112 is that it can sustain a high momentary power overload beyond the capability of the air compressor/motor 76. This is achieved by operating accumulator from both the air and the liquid sides. Specifically, when storing energy, as the air compressor 76 is working at full power compressing air into the accumulator 72, excess power is accommodated by pumping hydraulic liquid (using the pump/motor 80 or the optional hydraulic circuit 90 in the case when a hydraulic load is desired) into the accumulator as well. Similarly, during regeneration, the air motor 76 operates at full power and any power deficit is accommodated by depleting the hydraulic oil via the hydraulic motor 82 or the hydraulic circuit 90. In either situation, power overload will cause the pressure not to be maintained. This causes the energy storage capacity to decrease continuously with greater power overload beyond the power capability of the air compressor/motor. The energy storage capacity approaches that of a closed accumulator for very large power overload. For moderate power overload, energy storage capacity is still significantly higher than that of a closed accumulator with the same volume. Moreover, when the transient power overload stopped, the configuration in FIG. 5 can readjust the amount of hydraulic liquid and air in the accumulator to re-acquire the desired pressure. At this point, normal operation or another duration of power overload can occur again. Circuit 90 may also be the primary means used to put power into or extract it from the system and may use any type of source or sink of hydraulic fluid.

In situations where the pneumatic compressor/motor 76 is undersized or otherwise underpowered for a particular situation where a large transient load is greater than what the air compressor/motor can provide, the optional hydraulic circuit 90 can be employed. The circuit 90 is used in a manner similar to that of the close accumulator, in that when the load is positive (i.e., requires power), high pressure liquid from the liquid side of the accumulator 78 is bled out into a hydraulic load such as the hydraulic motor 94 in the transient circuit 90. Further, when the load is negative (i.e., the system stores power), the "load" pumps liquid to the liquid side of the accumulator. The hydraulic circuit 90 can be any hydraulic circuit that absorbs or provides hydraulic flow and may or may not contain a hydraulic pump/motor as shown in FIG. 5.

When the transient circuit 90 is in operation (for example, using the variable displacement pump/motor 94), the pressure in the accumulator 78 will no longer be maintained. When the load falls below the capability of the pneumatic motor/compressor 76, the normal operation can adjust the air/liquid volumes so that the desired pressure is re-acquired. If the transient load is in continuous operation (for a positive load), the liquid volume will deplete and the power level will drop to what the compressor/motor 76 can provide. For a negative load, the pressure in the accumulator 78 will build up quickly to the safety limit. The transient circuit 90 is then turned off. In both cases, energy storage capability goes down if a large continuous load is required. However, if the large load is transient, the open accumulator can recover after the large load ceases using the optional transient circuit 90.

Air Motor/Compressor Design

Figure 6:
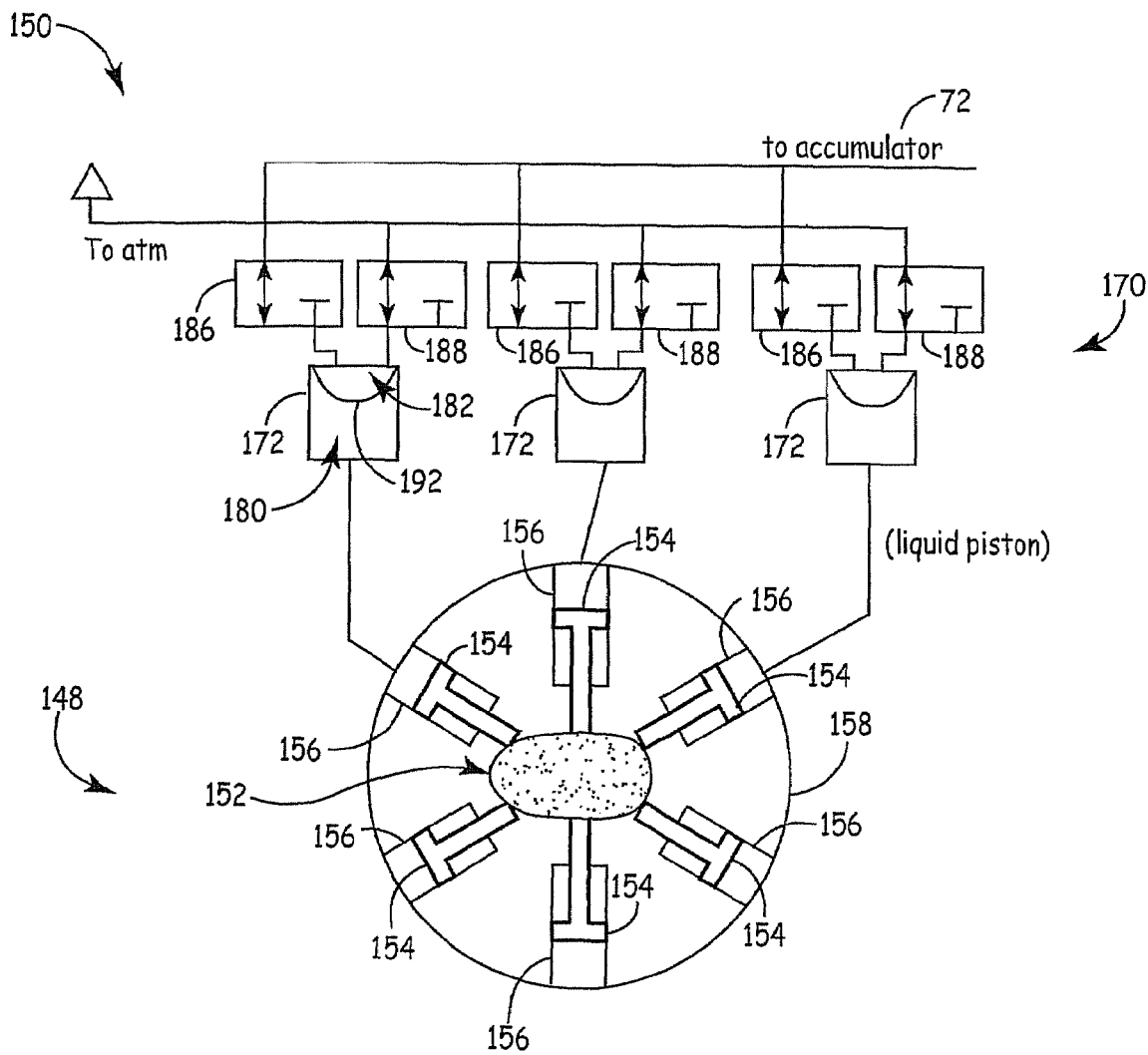
FIG. 6 is a simplified diagram of a air compressor/motor.

As open accumulator uses compression and expansion of air to store or regenerate energy, the air compressor/motor 76 should be efficient and powerful and is capable of operating at a high compression/expansion ratio. One air motor/compressor design consists of one or more stages. FIG. 6 is a simplified diagram showing a one-stage motor/compressor 150 which includes a hydraulic pump/motor 148 in accordance with one example embodiment. Motor/compressor 150 includes a rotating cam 152 configured to actuate pistons 154 carried in cylinders 156 of a housing 158. A control system 170 is provided which includes a series of compression/expansion chambers 172 associated with each of the pistons 154 and cylinders 156. Each expansion/compression chamber includes a liquid region 180 which couples to one of the cylinder 156 and is separated from an air region 182 by a moveable barrier 192. Each air region 182 couples to air valves 186 and 188. Valves 188 couple to atmosphere while valves 186 couple to the accumulator 72 shown in FIG. 5.

The motor/compressor for each stage makes use of multiple compression/expansion 172 chambers connected via (non-flamable) liquid pistons to the hydraulic pump/motor 148. The air-side of the chambers 172 are connected to the accumulator 72 and to the atmosphere. In the case of a multi-stage motor/compressor, they are connected to the intermediate accumulators connected to the higher and low pressure stages. The air and liquid are separated by a bladder material 192 (e.g. Viton). In the simplest case, the hydraulic pump/motor 148 is a radial piston pump/motor with each piston 154 controlling the volume of one compression/expansion chamber 172. Hydraulic liquid fills the volume between the bladder material and the solid piston of the hydraulic pump/motor. The liquid volume forms a liquid piston. Thus, the air chamber volume decreases as the radial piston extends, and increases as the radial piston retracts. The control and timing of the air valves determine whether the system is in storage or motoring mode, as well as the amount of air that will be compressed or expanded (i.e. the displacement).

The motoring mode begins when the expansion chamber 172 is filled with liquid. The pneumatic valve 186 is opened to the compressed air reservoir for a brief moment, and is then shut off. The duration that this valve is open determines the amount of compressed gas in the chamber 172 and hence the energy. The compressed gas in the chamber 172 expands, applying pressure through the liquid to the piston 154 on the hydraulic motor. When the air in the chamber 172 has expanded sufficiently, the pneumatic valve is opened to the atmosphere. This allows the hydraulic motor to push liquid into the chamber 172 with little resistance, returning the chamber 172 to an oil filled position where the next motoring cycle repeats.

The storage mode begins when the compression/expansion chamber 172 is filled with air at atmospheric pressure and the pneumatic valve 188 is opened to the atmosphere. The hydraulic pump 148 then pushes liquid into the chamber 172 decreasing the air volume by ejecting some of the air back into atmosphere. The pneumatic valve 188 is shut off when the desired amount of air to be compressed is reached. The air chamber volume continues to decrease until its pressure exceeds the pressure in the open accumulator 72. At this point, the pneumatic valve 186 is opened to the accumulator 72 and compressed air is pushed into the accumulator 72. When all the air is compressed into the accumulator 72, the liquid piston begins to retract. The pneumatic valve 186 closes to the accumulator 72 and opens to the atmosphere, drawing air into the compression for the next cycle.

Some of the advantages of this design are that:
1. The chambers can be sized and the valve timing selected so that during motoring full expansion to atmospheric pressure can be achieved. This maximizes the energy extracted from air.
2. The use of liquid pistons and enclosed compressed air chamber minimizes air leakage through gaps. This is achieved by preventing air from contacting any moving mechanical parts such as pistons and vanes. Moving mechanical parts require sufficient clearance and gaps for movement to occur. Air leakage through these gaps reduce the efficiency of the air compressor/motor.
3. Multiple chambers and pistons in different stages of expansion and filling allow for uniform overall torque profile.
4. The variation of the chamber volume with respect to the angle of rotation can be tuned by designing the cam profile of the radial piston pump/motor.
5. Each compression/expansion chamber and hydraulic pump/motor functions essentially the same as a regenerative circuit with a mini conventional accumulator. Efficient transduction of mechanical power can be expected.

While the description of a one stage air compressor/motor is described in FIG. 6, a multi-stage air motor/compressor can be similarly constructed with the inlet of one stage connected to the outlet of another stage via an intermediate compressed air reservoir. Furthermore, the description above uses a hydraulic radial piston pump/motor for illustration, other hydraulic pump/motor can be similarly used. One drawback of this design is that each radial piston must accommodate the full volume of each chamber. Since this volume is determined by the expanded air volume, the radial piston pump/motor needs to be quite large. For example, with the accumulator pressure at 35 MPa, it must accommodate 100 lpm of flow per kW of power. To increase compactness, it is possible to utilize an intensifier between the compression/expansion chamber and the radial piston pump/motor in FIG. 6. This then allows for the use of a smaller and more compact design. Another method is to utilize a smaller hydraulic pump/motor and operate it at a higher frequency than the cycling frequency of the expansion/compression chambers. Directional valves are used to achieve the desired extension and retraction of the liquid pistons.

Figure 7:
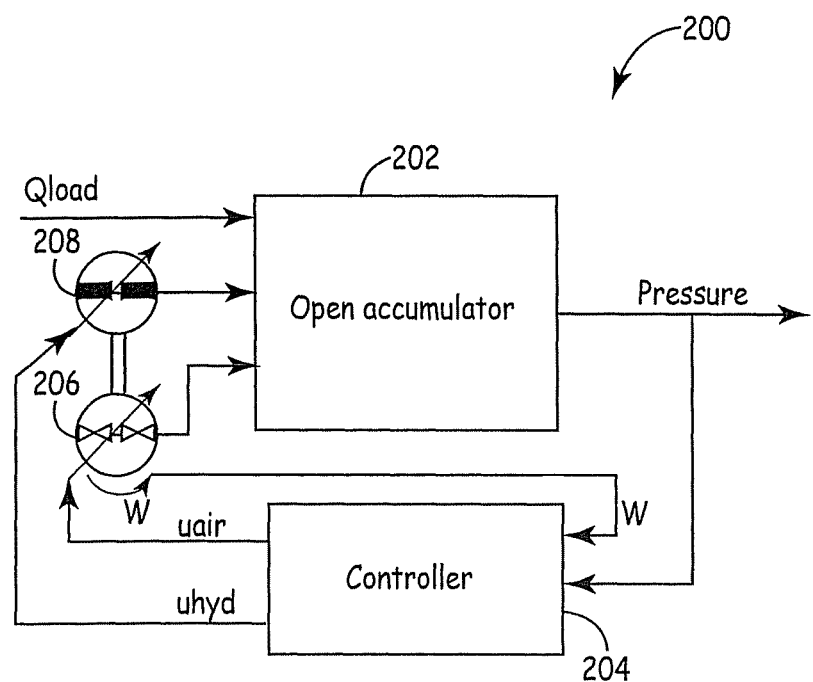
FIG. 7 is a simplified diagram of an open accumulator including a controller.
Figure 8A:
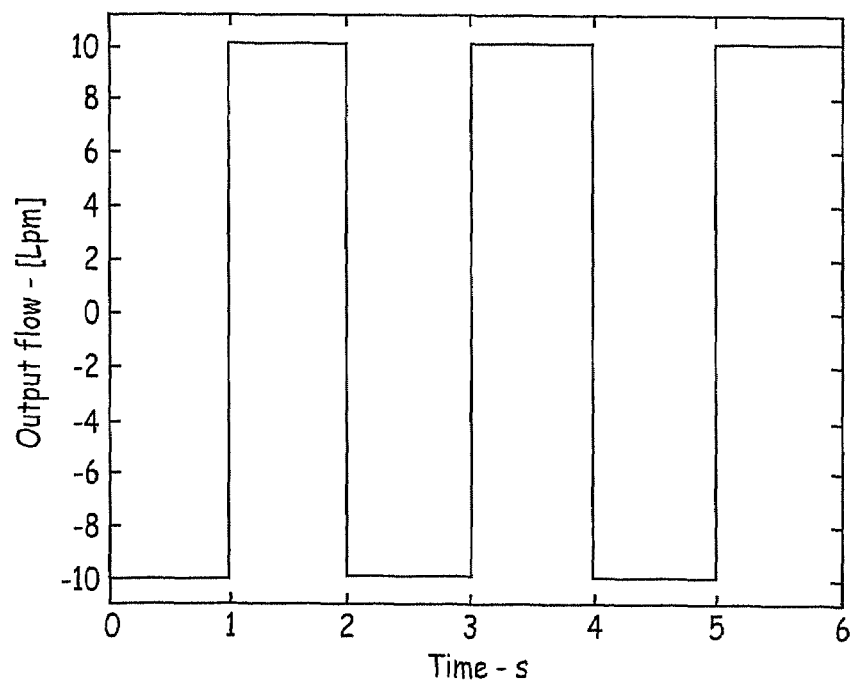
FIGS. 8A and 8B are graphs of output flow and control signals, respectively.
Figure 8B:
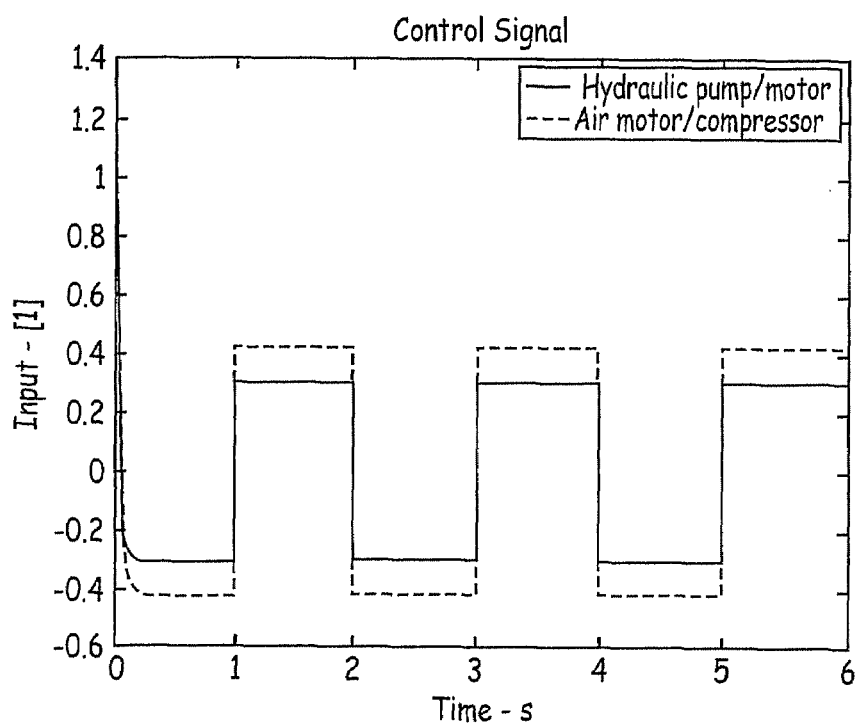
Figure 9A:
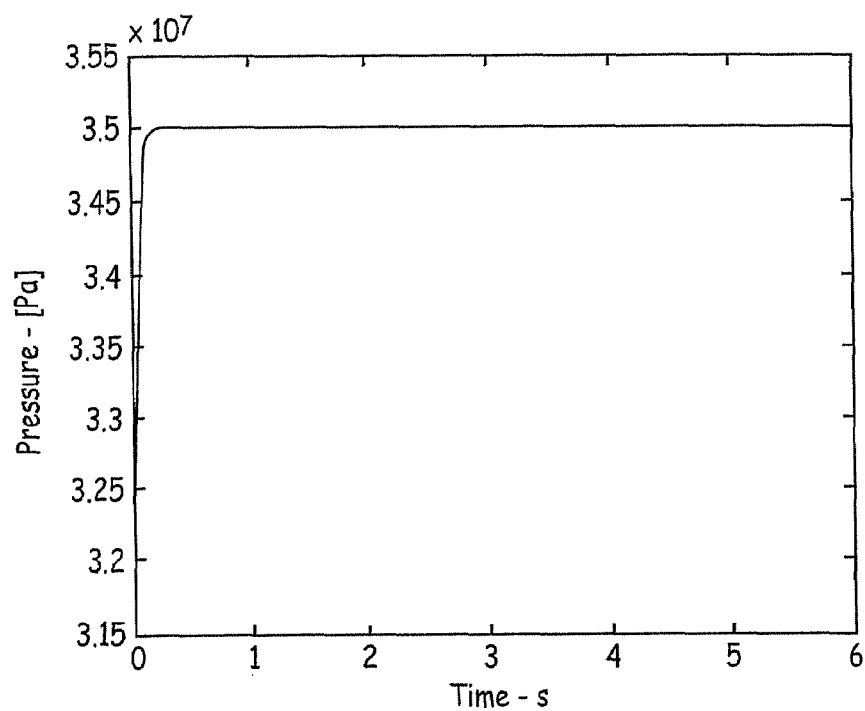
FIGS. 9A and 9B are graphs of pressure and frequency regulation.
Figure 9B:
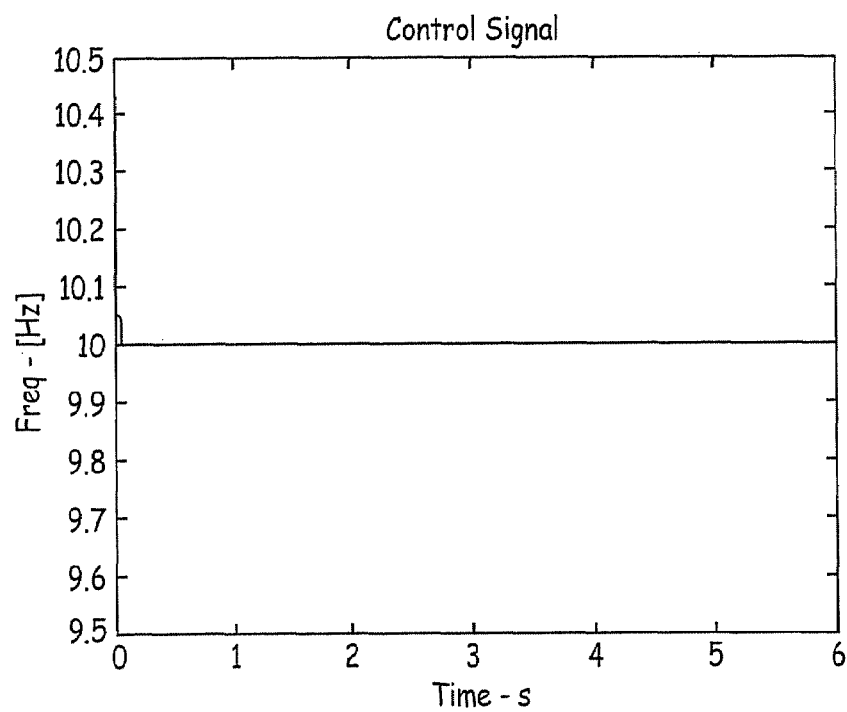
Figure 10:
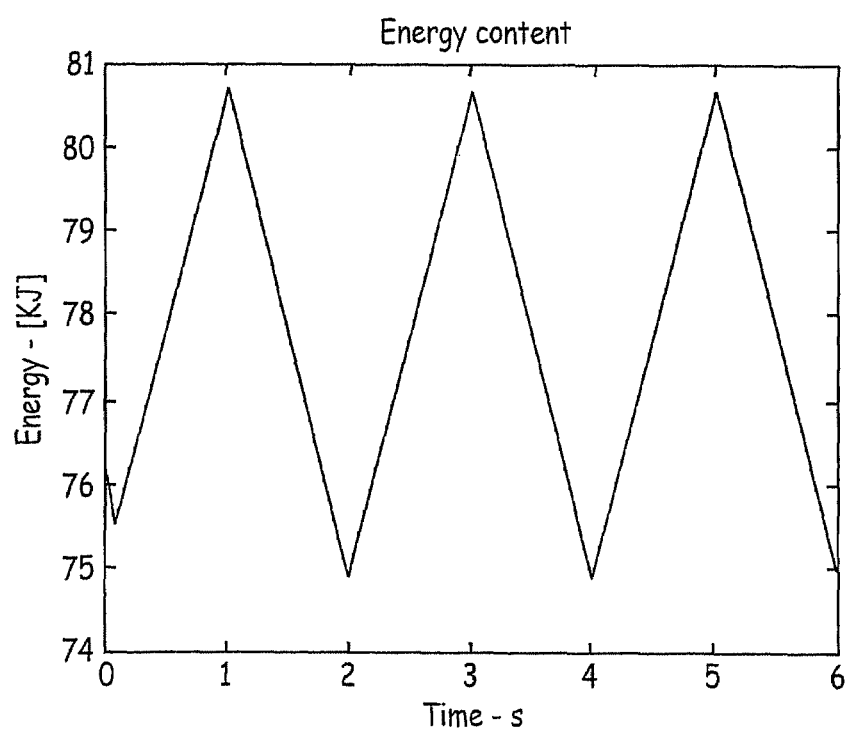
FIG. 10 is a graph of energy content of the accumulator versus time.

A control system for the open accumulator configuration in FIG. 5 can be used as shown in FIG. 7. FIG. 7 shows a energy storage system 200 including an open accumulator 202, a controller 204, along with a air compressor/motor 206 and a hydraulic compressor/motor 208. For simplicity, it is assumed that the air compressor/motor 206 and the hydraulic pump/motor 208 are connected in tandem and have the same rotational speed $\omega$. The system is loaded with an additional hydraulic load that draws hydraulic flow $Q_{load}(t)$ from the accumulator. The controller 204 determines the displacements of the air compressor/motor ($u_{air}$) and that of the hydraulic pump/motor ($u_{hyd}$) based on the accumulator pressure P and the compressor/motor-pump/motor speed $\omega$. The control is designed such that the displacements of the hydraulic pump/motor 208 and the air compressor/motor 206 are used to maintain the accumulator pressure P at 35 MPa, whereas the compressor/motor-pump/motor speed at 10 Hz. FIGS. 8, 9 and 10 show the results in which the demand flow $Q_{load}$ cycles between ±10 lpm. FIGS. 8A and 8B show the alternating output flow and control signals, FIGS. 9A and 9B show pressure and frequency regulation and FIG. 10 shows the energy content of the accumulator. This gives an alternating power storage and withdrawal profile. The pressure in the system is regulated at 35 MPa and the system speed is regulated at 10 Hz. The energy content of the accumulator also cycles in the desired manner.

The present invention includes a new "open accumulator" configuration for fluid power energy storage that can potentially improve the energy density by an order of magnitude. By not needing to contain the expanded gas volume, a much higher expansion ratio and hence energy is available, and the system volume can be decreased. With sufficient heat transfer, and a reliable heat sink/source, temperature variation due to the large compression/expansion ratio can be mitigated. The system can be operated in a constant pressure mode to maintain power capability throughout its operation. To realize its potential, an air compressor/motor should be used that can operate nearly isothermally to achieve good efficiency. Simulations indicate that proper heat transfer is critical for increasing the power capability and efficiency of the system.

Although the present invention has been described with reference to preferred embodiments, workers skilled in the art will recognize that changes may be made in form and detail without departing from the spirit and scope of the invention. As used herein, a flexible bladder, a liquid column, a piston assembly, etc. are examples of moveable isolation barriers and the present invention is not limited to these example configurations. The mechanical inputs and outputs can be provided through the optional hydraulic circuit. Phase change materials or materials with high specific heat capacity can be used to make the compression/expansion in the compressor/motor more uniform in temperature (isothermalization).

What is claimed is:

1. An accumulator system configured to store energy, comprising:
   an accumulator having a liquid coupled to a liquid port and gas coupled to a gas port;
   gas motor/compressor coupled to the gas port configured to receive a mechanical input and responsively pump gas into the accumulator, and to receive pressurized gas from the gas port and responsively provide a mechanical output; and
   a liquid source coupled to the liquid port to receive liquid from the accumulator and to provide liquid to the accumulator to maintain a pressure level in the accumulator within a desired pressure range which is independent of the amount of compressed gas and the amount of energy stored in the accumulator.

2. The apparatus of claim 1 including a hydraulic pump/motor which couples the liquid to the accumulator.

3. The apparatus of claim 2 wherein the hydraulic pump/motor is coupled to a shaft which provides mechanical input and output to the hydraulic pump/motor.

4. The apparatus of claim 2 wherein the hydraulic pump/motor is coupled to the liquid source.

5. The apparatus of claim 2 including a controller configured to control operation of the hydraulic pump/motor.

6. The apparatus of claim 5 wherein the controller controls operation of the gas motor/compressor and the hydraulic pump/motor based upon rotational speed of the gas motor/compressor.

7. The apparatus of claim 5 wherein the controller controls operation of the gas motor/compressor and the hydraulic pump/motor based upon pressure of the accumulator.

8. The apparatus of claim 1 wherein the gas compressor/motor is coupled to a shaft which provides mechanical input and output to the gas compressor/motor.

9. The apparatus of claim 1 including a hydraulic circuit coupled to the liquid of the accumulator.

10. The apparatus of claim 9 wherein the hydraulic circuit provides the hydraulic input and output.

11. The apparatus of claim 1 including a controller arranged to control operation of the gas motor/compressor.

12. The apparatus of claim 1 wherein the gas motor/compressor comprises a rotating cam arranged to drive a plurality of pistons.

13. The apparatus of claim 1 wherein the gas motor/compressor comprises a plurality of compressor/expansion chambers.

14. The apparatus of claim 13 wherein the gas motor/compressor includes a plurality of gas valves coupled to the compressor/expansion chambers, wherein each compression/expansion chamber coupled to a gas valve which connects to the accumulator and coupled to an gas valve which connects to atmosphere.

15. The apparatus of claim 1 wherein the gas pumped into the accumulator comprises atmospheric air.

16. The apparatus of claim 1 including a phase change material or materials with appreciable heat capacity as a heat source or heat sink to reduce temperature variation.

17. A method of storing energy in an accumulator, comprising:
   receiving mechanical energy;
   pumping gas into the accumulator in response to a mechanical input;
   receiving compressed gas from the accumulator and responsively providing a mechanical output; and
   adding liquid to the accumulator and removing liquid from the accumulator to thereby maintain a pressure level in the accumulator within a desired pressure range which is independent of the amount of compressed gas and the amount of energy stored in the accumulator.

18. The method of claim 17 wherein adding and removing gas from the accumulator is in response to mechanical/hydraulic power input and mechanical/hydraulic power demand.

19. The method of claim 17 wherein adding and removing liquid from the accumulator is in response to mechanical/hydraulic power input and mechanical/hydraulic power demand.

20. The method of claim 17 including controlling a gas compressor/motor.

21. The method of claim 17 wherein the gas pumped into the accumulator comprises atmospheric air.

22. The apparatus of claim 1 wherein the accumulator includes an gas chamber containing the gas and a liquid chamber containing the liquid which are separated by a movable barrier.

* * * * *

UNITED STATES PATENT AND TRADEMARK OFFICE
CERTIFICATE OF CORRECTION

PATENT NO. : 8,413,436 B2
APPLICATION NO. : 12/445176
DATED : April 9, 2013
INVENTOR(S) : Perry Y. Li and James D. Van de Ven It is certified that error appears in the above-identified patent and that said Letters Patent is hereby corrected as shown below:

In the Specifications:

Col. 1, lines 14-16, delete:
"The United States government has certain rights in this invention pursuant to Agency Grant No. EEC 0540834 awarded by National Science Foundation."

and insert:
--This invention was made with government support under EEC-0540834 awarded by the National Science Foundation. The government has certain rights in the invention.--

Signed and Sealed this
Eighteenth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.       : 8,413,436 B2
APPLICATION NO.  : 12/445176
DATED            : April 9, 2013
INVENTOR(S)      : Li et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this
First Day of September, 2015

Michelle K. Lee
*Director of the United States Patent and Trademark Office*